(12) United States Patent
Early et al.

(10) Patent No.: US 7,249,920 B2
(45) Date of Patent: Jul. 31, 2007

(54) STRAPPING RETAINER FOR LADING AND METHOD FOR USING THE SAME

(75) Inventors: David R. Early, Carol Stream, IL (US); Rudolph E. Nadherny, Golden, MO (US)

(73) Assignee: Ireco, LLC, Bensenville, IL (US)

( * ) Notice: Subject to any disclaimer, the term of this patent is extended or adjusted under 35 U.S.C. 154(b) by 189 days.

(21) Appl. No.: 11/156,207

(22) Filed: Jun. 17, 2005

(65) Prior Publication Data

US 2006/0285938 A1 Dec. 21, 2006

(51) Int. Cl.
*B61D 45/00* (2006.01)
(52) U.S. Cl. ........................................ 410/96
(58) Field of Classification Search ............... 410/96, 410/97, 100
See application file for complete search history.

(56) References Cited

U.S. PATENT DOCUMENTS

| | | | |
|---|---|---|---|
| 1,068,066 A | | 7/1913 | Martin |
| 2,226,667 A | | 12/1940 | Love |
| 2,455,237 A | | 11/1948 | Davis |
| 3,224,385 A | | 12/1965 | Elsner |
| 3,425,472 A | | 2/1969 | Marino |
| 3,429,537 A | * | 2/1969 | Jantzen ............... 410/116 |
| 3,659,641 A | | 5/1972 | Marino |
| 3,831,976 A | * | 8/1974 | Iden, Sr. ............... 410/104 |
| 3,837,048 A | * | 9/1974 | Lewis et al. ........... 24/613 |
| 4,846,610 A | | 7/1989 | Schoenleben |
| 5,226,544 A | | 7/1993 | Gallucci et al. |
| 5,408,770 A | | 4/1995 | Suzuki |
| 6,422,794 B1 | | 7/2002 | Zhan et al. |
| 6,767,169 B2 | | 7/2004 | Zhan et al. |
| 6,808,346 B2 | | 10/2004 | Zhan et al. |

OTHER PUBLICATIONS

General Information Series No. 681, "Wide Roll Printing Paper Secured by 1 ½" Wide Polyester Cord Straps in Cushion Equipped Boxcars, RAILINC, Jan. 2002.

* cited by examiner

*Primary Examiner*—H Gutman

(57) ABSTRACT

A retainer having an elongated body secures one end of a cargo-engaging strapping to a wall anchor of a cargo transport unit wall. In operation, a loop is formed in the strapping and passed from a first side of the anchor to a second side, where the retainer is inserted within the loop, such that the loop engages a portion of a strapping-engaging surface of the retainer body. Then the loop is pulled toward the anchor until the retainer seats against the anchor. Finally, the portion of the strapping extending from the first side is pulled toward the second side, whereby a loose end of the loop is secured against the anchor. The retainer prevents strapping slippage along the anchor, which preserves the tension in the strapping and prevents the cargo from shifting and becoming damaged. The retainer also allows for improved application and removal of the strapping.

25 Claims, 4 Drawing Sheets

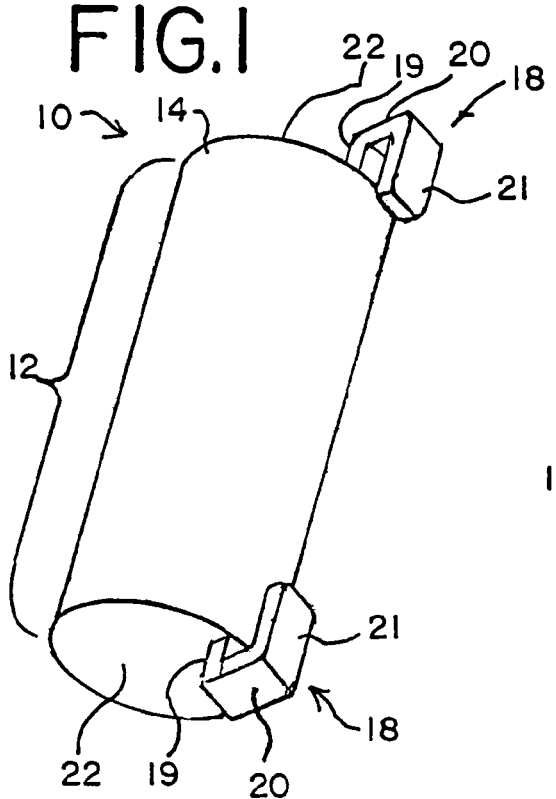
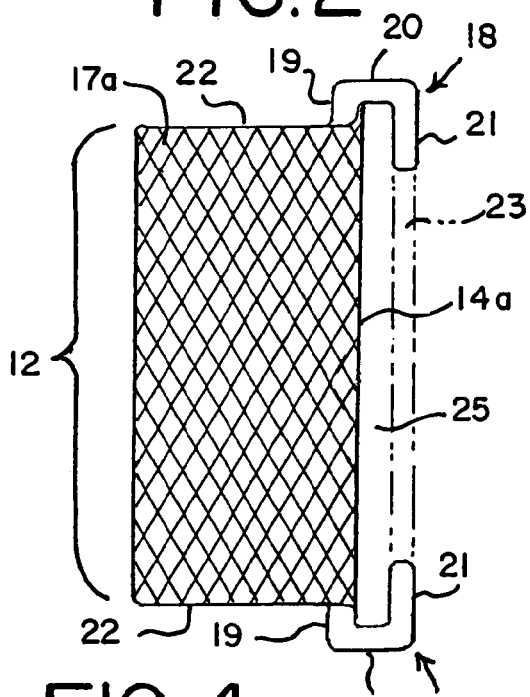
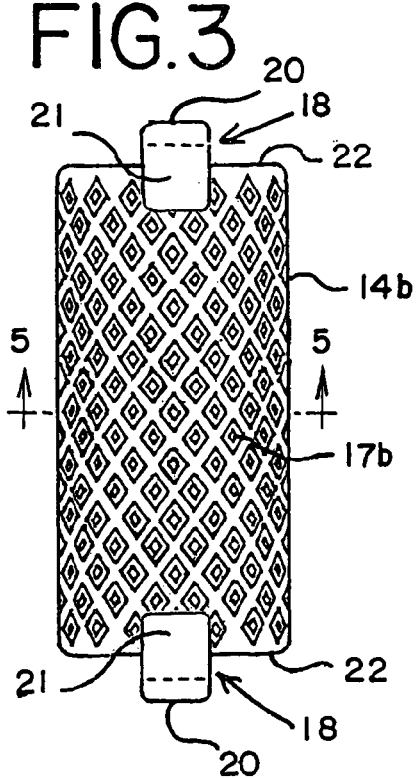
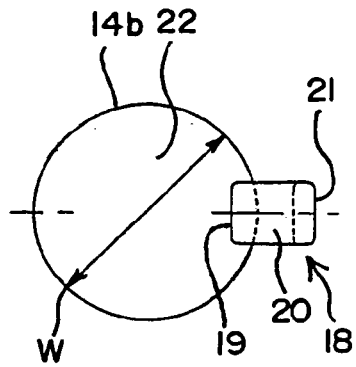
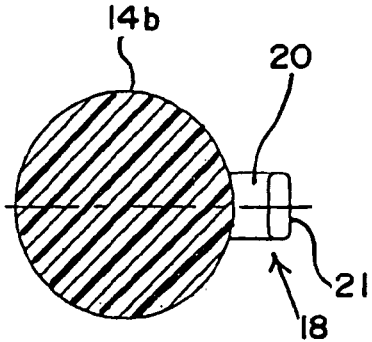

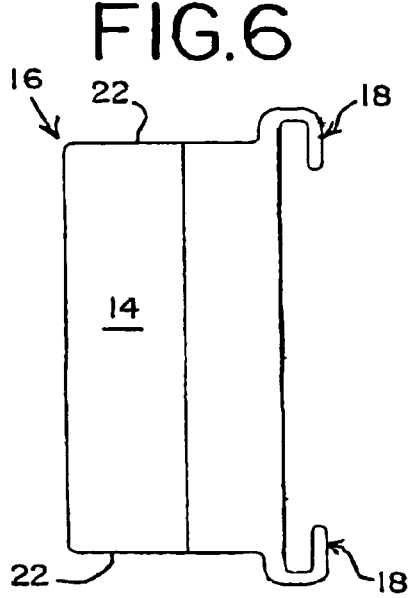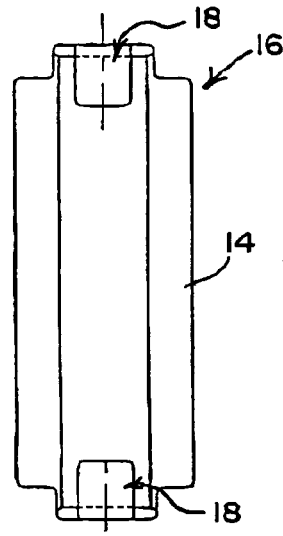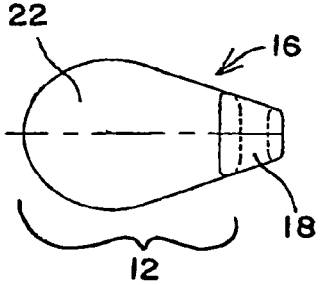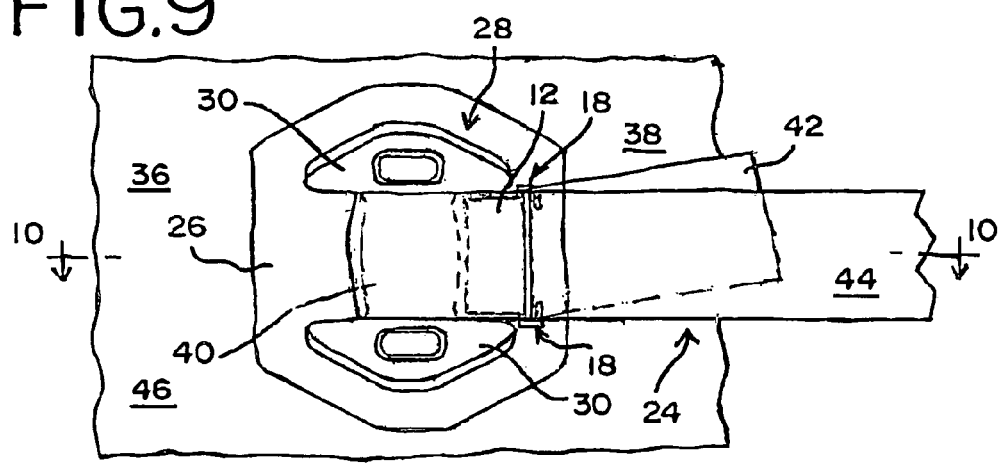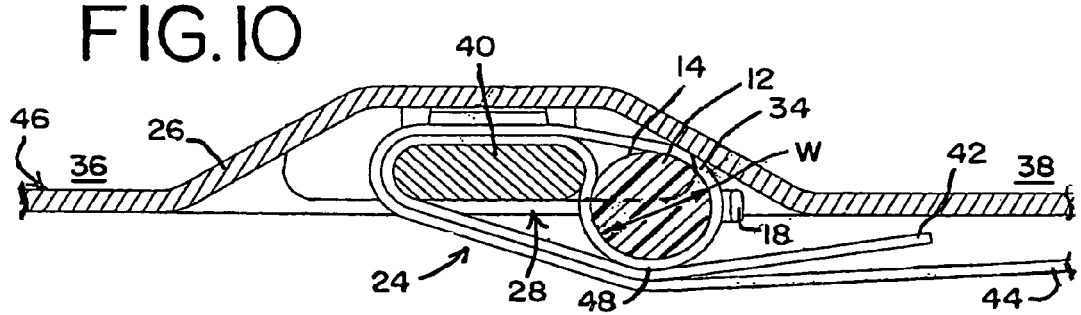

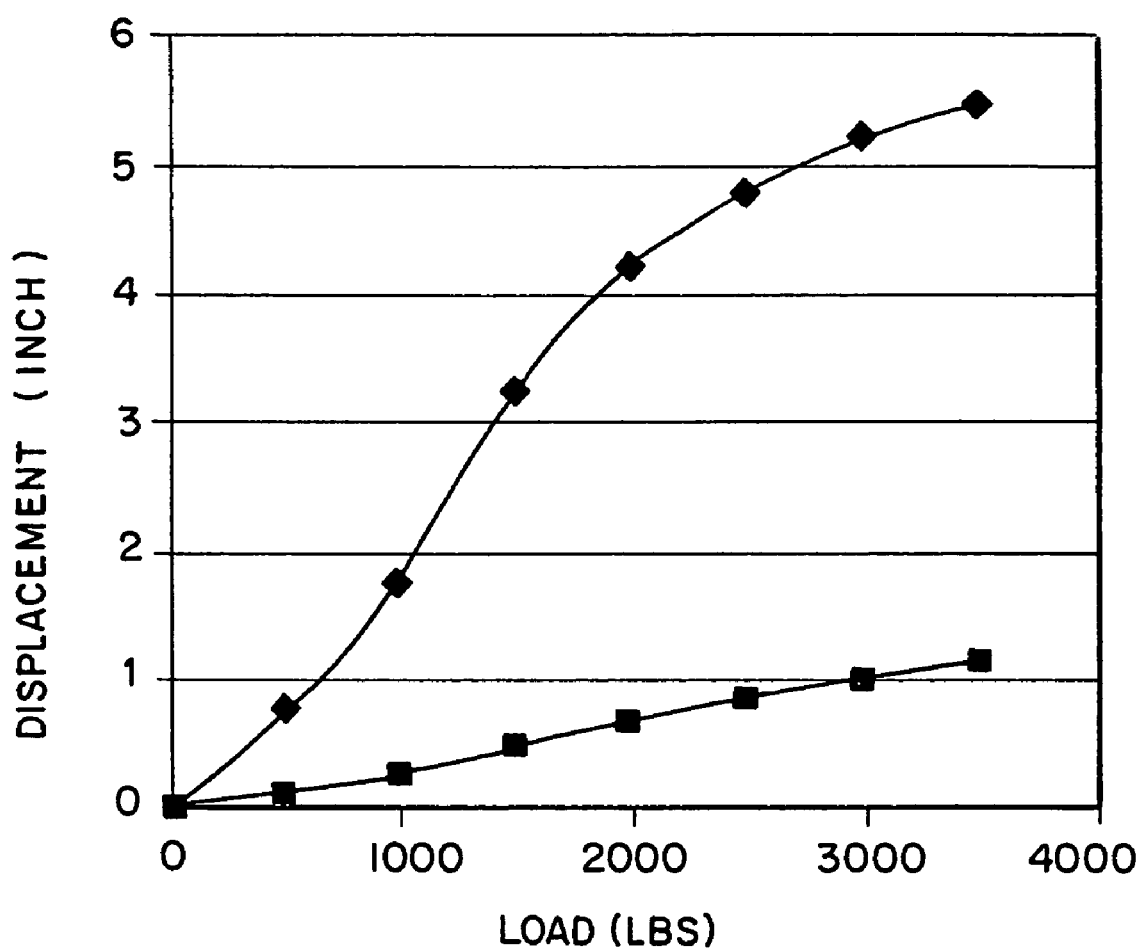

STRAPPING RETAINER FOR LADING AND METHOD FOR USING THE SAME

BACKGROUND OF THE INVENTION

1. Field of the Invention

This invention generally relates to a retainer and method for securing cargo, using strapping, onto cargo transport units having wall anchors. A retainer is used with strapping and a wall anchor to decrease the occurrence of strapping slippage and potential subsequent cargo damage. The retainer also provides for decreased application and removal time and a safer removal process. The method uses a retainer to quickly secure cargo and to prevent strapping slippage and potential subsequent cargo damage. Special application is found for this approach in securing wide rolls of printing paper transported by boxcar.

2. Description of Related Art

According to standards issued by the Association of American Railroads ("AAR") in publications such as General Information Series No. 681; "Wide Roll Printing Paper Secured by 1½" Wide Polyester Cord Straps in Cushion Equipped Boxcars," which is hereby incorporated herein by reference, wide rolls of printing paper transported by boxcar are to be secured with a plurality of 1.50 inch wide polyester cord straps which are secured to the boxcar sidewalls by wall anchors or lading tie anchors. One end of a strap is wrapped around a wall anchor three times and knotted, in order to prevent disengagement of the strap from the anchor. Once the rolls are loaded, the straps from opposite sides of the boxcar are joined together and tensioned with a buckle to securely grip the rolls.

One problem with the above-described process is that there can be slippage and stretching of the polyester straps. Sudden movements of the boxcar cause lading such as the rolls of this AAR standard to exert substantial force on the lading, which applies force against the polyester straps. If not properly secured, the lading will shift. When the knot system is used, this applied force causes the knots to tighten and slip. Eventually, the knots slip toward the wall anchors and become tightly wedged between the anchor and the wall. As a result of this slipping, several inches of slack are added to the straps and they cease to tightly grip the lading, which allows the lading to more easily shift, become damaged, or even fall.

Another problem with using knots to secure the polyester straps is that the initial application process is lengthy, as is the removal process. According to AAR standards, the strap must be wrapped around the wall anchor three times before it is knotted. This can require constant readjustment to ensure that a proper length of strap extends beyond the anchor, such that it can be tied in a knot. The removal process is even more lengthy, because the knots become wedged behind the anchors and must be removed with a knife or similar cutting instrument or the knot and strap can be burned off. In most instances, a ladder must be used to reach the higher straps and it is especially time-consuming and cumbersome, if not dangerous, to use a knife or fire to remove the knots while standing on a ladder.

Accordingly, a general object and aspect of the present invention is to provide a cargo-securing device for use with strapping and existing wall anchors of a cargo car or other cargo transport unit.

Another object or aspect of this invention is to provide a cargo-securing device which reduces the amount of cargo damage resulting from strapping slippage caused by knots tightening, stretching, and slipping behind wall anchors and the like during transport.

Another object or aspect of this invention is to provide a cargo-securing device which can be easily and safely applied and removed from the strapping and wall anchors for securing the strapping.

Another object or aspect of this invention is to provide a cargo-securing device which is sufficiently simple and inexpensive to be disposable.

Another object or aspect of this invention is to provide a cargo-securing method which eliminates the need to use a knot to secure strapping to wall anchors for transport of cargo such as wide rolls of printing paper in a boxcar or the like.

Other aspects, objects and advantages of the present invention, including the various features used in various combinations, will be understood from the following description according to preferred embodiments of the present invention, taken in conjunction with the drawings in which certain specific features are shown.

SUMMARY OF THE INVENTION

In accordance with the present invention, a strapping retainer reduces the amount of strapping slippage when installed for the purpose of restraining lading in a cargo transport unit, especially a rail car. The strapping retainer makes it possible to eliminate the knot typically associated with the wall anchor. The strapping retainer has a body with a top end, a bottom end, and a strapping-engaging surface connecting the two ends. The retainer body fits into a loop of a strapping length at one side of a wall anchor and is configured and sized such that it resists becoming wedged behind the wall anchor when it and the loop are pulled toward the wall anchor during transport of cargo. Strapping slippage is virtually eliminated, because there is no knot which can tighten and become wedged behind the wall anchor, thereby elongating the effective strapping length after installation. Furthermore, the retainer may be formed of a lightweight plastic which resists deformation, but is inexpensive and disposable.

A cargo-securing method uses the described retainer to reduce or eliminate strapping slippage at the wall anchor and resulting strapping elongation after being installed to restrain cargo or lading. A loop is formed in the strapping, then inserted behind the wall anchor, from a first side of the anchor to a second side. A retainer is inserted into the strapping loop and the strapping is pulled back toward the first side until the retainer seats adjacent to the anchor or is otherwise prevented from further movement toward the anchor. Finally, the strapping is pulled around the front of the anchor toward the second side to develop a pinch-point condition, then this strapping is secured to another strapping length using a conventional buckle such as a disposable turnbuckle.

BRIEF DESCRIPTION OF THE DRAWINGS

FIG. 1 is a front perspective view of a preferred strapping retainer according to the present invention;

FIG. 2 is a front elevational view of a strapping retainer according to the present invention;

FIG. 3 is a left side elevational view of the strapping retainer of FIG. 2 having another embodiment of a knurled surface;

FIG. 4 is a bottom plan view of the strapping retainer of FIG. 3;

FIG. 5 is a bottom cross-sectional view of the strapping retainer of FIG. 3, along the line 5-5 of FIG. 3;

FIG. 6 is a front elevational view of a strapping retainer according to an alternative embodiment;

FIG. 7 is a left side elevational view of the strapping retainer of FIG. 6;

FIG. 8 is a bottom plan view of the strapping retainer of FIG. 6;

FIG. 9 is a front elevational view of a cargo-securing system having a strapping retainer according to the present invention;

FIG. 10 is a top cross-sectional view of the cargo-securing system of FIG. 9, along the line 10-10 of FIG. 9, illustrating a pinch-point condition according to the invention;

FIG. 15 is chart which compares the strapping displacement of the knot system to a cargo-securing system according to the present invention.

DESCRIPTION OF THE PREFERRED EMBODIMENTS

Figure 12:
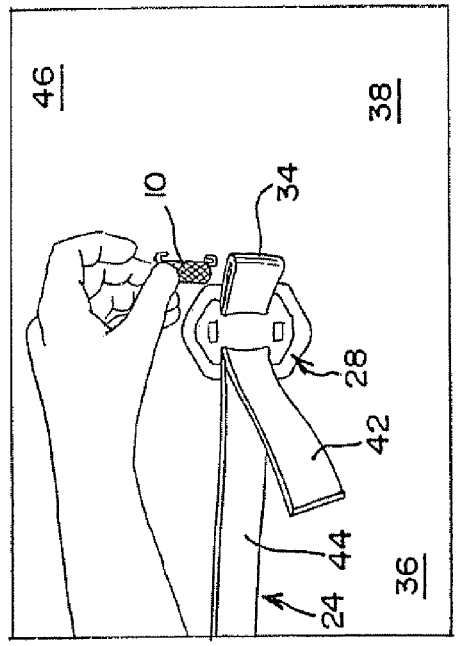
FIG. 12 shows a retainer-placement step of an application process according to the present invention.

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention and virtually any appropriate manner.

FIG. 1 shows a strapping retainer 10 with a body portion 12 defined by top and bottom ends 22 which are connected by a strapping-engaging surface 14. It is typically preferable that the strapping-engaging surface 14 is smoothly shaped. When used herein, the term "smoothly shaped" is intended to describe a body portion 12 that is generally curved or arcuate about a strapping-engaging surface 14, rather than having sharp or angled edges. For example, FIGS. 1-5 illustrate a strapping-engaging surface 14 having a generally arcuate or circular profile and FIGS. 6-8 illustrate a retainer 16 according to an alternative embodiment, which has a body portion with a generally teardrop-shaped profile. A smoothly shaped strapping-engaging surface 14 is preferable because it reduces the risk of severing the strapping at high tensile forces. Furthermore, the smoothly shaped profiles of the strapping-engaging surfaces of retainers 10 and 16 are configured to seat adjacent to the wall anchor, as described herein.

The illustrated preferred embodiment of FIGS. 1-5, has an elongated, generally cylindrical body portion 12 with a strapping-engaging surface 14. FIG. 2 shows surface 14a with a plurality of textured knurls 17a, and FIG. 3 shows surface 14b with a plurality of textured knurls 17b. Also shown in FIGS. 1-5 are two strapping-engaging ears 18 extending from the top and bottom ends 22 of the body portion 12.

The height of the body portion 12 is not critical, although a relatively short body portion 12 is preferable for some anchor configurations. For example, FIG. 9 illustrates a retainer 10 having a body portion 12 seated adjacent to a dogbone-shaped wall anchor 28 having top and bottom anchor flanges 30. When used with such an anchor 28, the body portion 12 is preferably slightly shorter than the width of the strapping 24, because otherwise the retainer body 12 could possibly be interfered with by the top and bottom flanges 30 when seated against the anchor 28.

FIGS. 4 and 10 show a dimension W of the retainer body 12, which represents a blocking width. As best illustrated in FIG. 10, the retainer 10 must be configured and sized such that the aggregate width of the body portion 12, when engaging the strapping 24, is larger than the space behind the anchor 28. As can be deduced from FIG. 10, the blocking width W must be no less than the width of the space behind the anchor 28, less two times the thickness of the strapping 24. When the blocking width W is greater than this value, the body portion 12 will block the retainer 10 from slipping behind the anchor 28. However, when W is less than this minimum value the retainer 10 will slip behind the anchor 28 and cause the strapping 24 to become disengaged from the cargo. As the extreme tensile forces applied to the strapping 24 tend to cause it to temporarily stretch and become thinner, it is generally preferable to provide a retainer 10 having a body portion 12 with a blocking width W at least equal to the width of the space behind the anchor 28, which ensures the blocking function regardless of strapping stretching.

The knurls 17 illustrated in FIGS. 2 and 3 are optional features. The knurls 17a add texture to the strapping-engaging surface 14a. The knurls 17b of FIG. 3 are slightly raised above the strapping-engaging surface 14b and are diamond-shaped. The illustrated knurls 17 are arranged in a regular pattern, but other configurations are possible.

Ears 18 can be provided when desired. The primary function of the ears 18 is to temporarily secure the retainer 10 to the strapping 24 before the strapping 24 is tightened. Once the strapping 24 is tightened it will hold the retainer 10 in place, so the function provided by the ears 18 is no longer needed. In the illustrated embodiments of FIGS. 1-8, two identical ears 18 are provided in alignment with each other. Each ear 18 can have a vertical extension 19, has a horizontal extension 20, and has an overhang 21 associated with the horizontal extension 20. When the vertical extension 19 is provided, it is associated with the horizontal extension 20.

In the illustrated embodiments having vertical extensions 19, the vertical extensions 19 are generally flush with the strapping-engaging surface 14 and extend away from the top and bottom ends 22 of the body portion 12. These vertical extensions 19 of the two ears 18 are sized such that the space between the horizontal extensions 20 is slightly wider than the width of the strapping 24.

Each horizontal extension 20 is sized such that the space between the associated vertical extension 19 and overhang 21 is slightly wider than the thickness of the strapping 24. The illustrated overhangs 21 extend toward each other to effectively form opposing hooks which are capable of engaging the strapping 24. Hence, from the preceding description, it can be seen that the ears 18 are configured and oriented to form hooks which cooperate to define an open channel into which the strapping 24 can be slid or otherwise inserted when the retainer 10 is initially applied. Alternative embodiments are possible, such as a single top ear or top and bottom ears 18 which are connected by a bridge 23, illustrated in phantom in FIG. 2, to form a closed channel 25 for the strapping 24. Of course, it is also possible to provide a retainer 10 without ears 18, but the strapping 24 must be immediately tightened, otherwise the retainer 10 may move from its in-use position and become disengaged or misaligned.

Referring back to FIG. 9, a retainer 10 and strapping 24 in the final applied configuration are shown. This final applied configuration can also be seen in FIG. 10, which illustrates the manner in which the strapping 24 wraps around the wall anchor 28 and strapping-engaging surface 14. The cargo-securing system and associated application method illustrated in FIGS. 9-14 and in the accompanying description refer to a specific application of a retainer 10 according to the present invention to the sidewall 46 of a boxcar having a dogbone-shaped lading tie anchor 28 and an associated sidewall depression 26. The described process is particularly applicable to the printing paper roll securement problem which has heretofore been encountered by the knot system discussed herein. However, the present invention is generally applicable to any wall with an associated anchor having a member which is generally parallel to and spaced apart from the surface of the wall, such as tie bar 40. When used herein, the term "wall" is meant to include floors, ceilings, and other similar generally planar surfaces of cargo transport units which are capable of supporting an anchor or equivalent structure.

During transport, the cargo is generally stationary in the storage area of the cargo transport unit once it has been secured by lengths of strapping. However, sudden movements of the cargo transport unit will cause the cargo to shift and apply force to the strapping lengths. In the knot system according to existing AAR standards, this applied force translates into knot slippage and strapping stretching. The slipping of the knot is much more problematic than the stretching of the strapping, because the polyester strap according to existing AAR standards has elastic properties which return it to an unstretched configuration after the removal of the applied force. On the other hand, the slack in the strap caused by knot slippage remains even after the applied force is removed and the cargo becomes inadequately secured. The present invention eliminates slippage, thereby limiting any strapping displacement to temporary strapping stretching.

Figure 11:
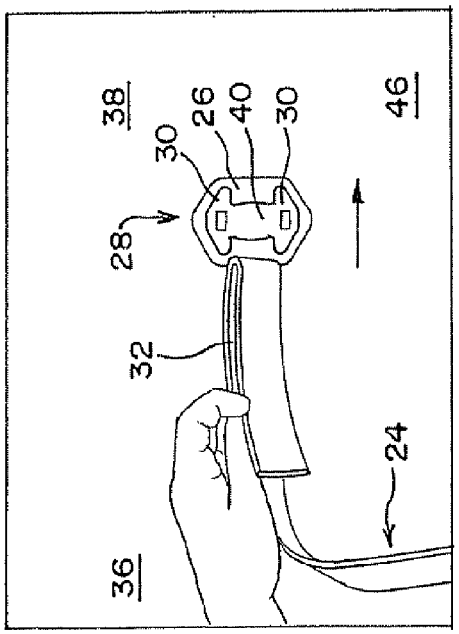
FIG. 11 shows a looping step of an application process according to the present invention.

FIGS. 11-14 illustrate the process by which the strapping 24 and retainer 10 are applied, such that they finally arrive in the configuration of FIGS. 9 and 10. Two lengths of strapping 24 are needed to fully span the width of a typical boxcar, so the described process is repeated for both sides of the boxcar before the two strapping lengths are finally buckled together. FIG. 11 shows a looping step, wherein an end portion of the strapping 24 is folded over itself to form an initial loop 32. Preferably, the portion of the strapping 24 used to form the initial loop 32 is at least one foot long, so as to optimally secure the cargo, as described herein. Part of the initial loop 32, referred to herein as the receptor loop 34 and illustrated in FIG. 12, is passed from one side of the wall anchor 28, referred to herein as the end wall side 36, to the other side of the wall anchor 28, referred to herein as the doorway side 38. This configuration is suitable when the strapping 24 applies a force to the cargo in the direction of the end wall side 36. Of course, if the strapping is to apply a force in the opposite direction, then the receptor loop 34 is instead passed from the doorway side 38 to the end wall side 36 and all references to the end wall side 36 and the doorway side 38 in the following process are reversed.

The receptor loop 34 is passed through the area defined by the wall anchor flanges 30, the wall anchor tie bar 40, and the sidewall depression 26. As shown in FIG. 12, part of the initial loop 32, referred to herein as the loose end 42, does not pass behind the wall anchor 28 and instead remains on the end wall side 36. The remainder of the strapping 24, referred to herein as the long end 44, is disposed between the sidewall 46 and the loose end 42 on the end wall side 36. Once the initial loop 32 is in this configuration, the retainer 10 is placed within the receptor loop 34. If the retainer 10 includes ears 18, then the ears 18 can be hooked onto the receptor loop 34 before the strapping 24 is tightened.

Figure 13:
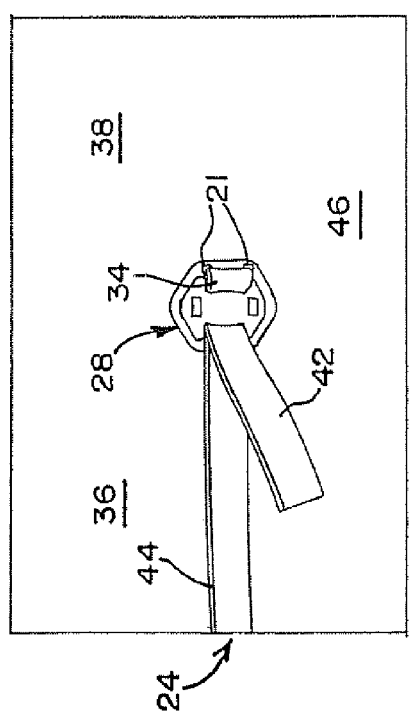
FIG. 13 shows a seating step of an application process according to the present invention.

With the retainer 10 inside the receptor loop 34, the strapping 24 is pulled toward the end wall side 36 until the retainer 10 seats within the sidewall depression 26, adjacent to the tie bar 40, and between the anchor flanges 30. This configuration is illustrated in FIG. 13. Preferably, in this configuration, the loose end 42 extends at least four inches beyond the tie bar 40, for reasons described herein.

The retainer 10 is sized such that it does not pass behind the tie bar 40 as it is pulled toward the end wall side 36. Further, the retainer 10 is preferably formed of a relatively non-deformable material so that it will not deform and become wedged behind the tie bar 40. Any material which would become perceptibly deformed by a 3,500 pound load in operation is considered to be inappropriate. It is believed that material having a flexural modulus greater than 500 kpsi is sufficiently non-deformable for forming the retainer 10. In particular, we have found that a retainer 10 formed of a 33% glass-filled nylon polymer (flexural modulus of 1,350 kpsi) or a 30% glass-filled nylon polymer (flexural modulus of 1,230 kpsi) is adequate, but one formed of material such as TEXIN® 260 polymer(flexural modulus of 43 kpsi) or TEXIN® 4210 polymer (flexural modulus of 100 kpsi) is not and will deform as a result of the forces to which the retainer 10 is typically subjected during transport. As will be appreciated by one skilled in the art, a retainer 10 formed of a material such as 33% glass-filled nylon polymer or 30% glass-filled nylon polymer is strong enough to be used repeatedly, yet inexpensive enough to be disposed along with the used strapping.

Figure 14:
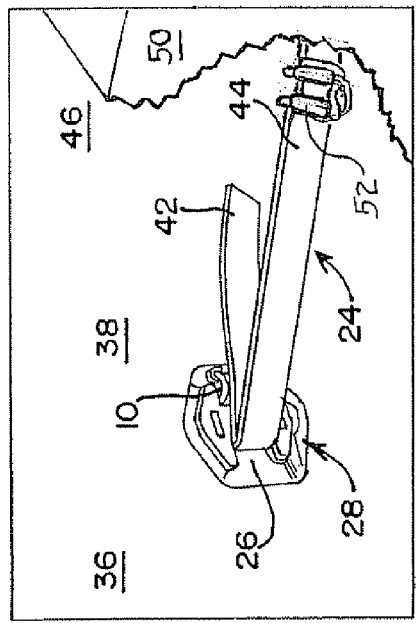
FIG. 14 shows a tightening step of an application process according to the present invention.

After the retainer 10 has become seated against the anchor 28, the loose end 42 and long end 44 of the strapping 24 are pulled across the front of the tie bar 40 toward the doorway side 38. This configuration is illustrated in FIGS. 9, 10, and 14. FIG. 10 shows that, during application, the ears 18, if present, are preferably oriented such that they do not interfere with the sidewall depression 26, the tie bar 40, or any other surface which engages the strapping 24. As best shown in FIG. 10, when the long end 44 is tightened, it secures the loose end 42 against the tie bar 40, which prevents slippage. Further, the blocking width W of the retainer body 12 is preferably sized and oriented such that a portion of the strapping-engaging surface 14 extends beyond a front portion of the tie bar 40. This provides a second securing area 48, referred to herein as the pinch-point, whereby the loose end 42 is secured between the long end 44 and receptor loop 34. The formation of the pinch-point 48 provides even more securement, because the force of the long end 44 against the loose end 42 is transmitted to the receptor loop 34, which is held against the retainer body 12 and prevented from slipping along the anchor 28. If the loose end 42 does not extend comfortably beyond the tie bar 40, such as at least about four inches, then there can be some difficulty in consistently achieving the pinch-point 48. Finally, the long end 44 is pulled around the cargo 50 (shown cut away in FIG. 14) and tensioned with a buckle, such as a turn-buckle type of arrangement 52, in front of the cargo 50.

To summarize, slippage is reduced by the above-described application process, because the strapping secures a loose end of the initial loop against the wall anchor. Slippage is further reduced by providing a retainer which is sufficiently sized, such that it resists becoming wedged behind the wall anchor and also provides a second area at which the strapping secures the loose end of the initial loop. It has been observed that slippage is essentially eliminated and the only slack in the strapping is the result of the temporary stretching of the strapping itself. Therefore, the strapping remains well-contoured to the cargo and the risk of damage to the cargo is greatly reduced. It will be appreciated that the described application process can be accomplished much quicker than the known knot system.

FIG. 15 shows the results of a strapping displacement test which compares the knot system according to the AAR standard and the cargo-securing system according to the present invention. In the test, strapping of polyester chording was alternatively attached to a typical dogbone-shaped lading tie anchor by a knot and a retainer. This strapping is according to the AAR publication regarding wide roll printing paper securement that is discussed above. The wall anchor was clamped on its end wall side and the long end of the strap was clamped on the doorway side. A mark was made on the strap at the end wall side of the wall anchor and the clamps were pulled apart by different levels of applied force. The displacement illustrated in FIG. 15 was observed.

It will be seen that use of the knot system results in approximately 5.25 inches of displacement between the clamps when a 3,000 pound load is applied to the strap. At the same applied force, the mark moved approximately four inches, which is equal to the amount of knot slippage. These four inches of slack in the strap remain after the force is removed and the strap returns to near its original length. When in use, this slippage causes the cargo to become relatively unsecured. Furthermore, there are a total of eight inches of slack in operation, because there are two straps connected across the width of the boxcar by a buckle. Therefore, the risk of cargo damage is greatly increased, because the cargo will not be well-supported by the straps, allowing for further shifting of the cargo.

On the other hand, for the same 3,000 pound load, there was only approximately one inch of displacement between the clamps for the retainer system. Additionally, the mark did not become displaced when the retainer was used, which indicates that the retainer system virtually eliminates slippage. Thus, the only element of displacement associated with use of the retainer system is the unavoidable stretching of the strap itself, which is approximately one inch at 3,000 pounds of applied force for strapping of this length. As previously explained, this strapping stretching is temporary and the strapping returns to its unstretched length and tension once the applied force is removed. Hence, the straps remain well-contoured to the cargo and the risk of cargo damage is greatly decreased.

In further contrast to the known knot system or other cargo-engaging strapping securing systems, the present invention also allows for quick and safe removal of the lengths of strapping after transport. The retainer 10 does not become wedged behind the wall anchor 28, so the retainer 10 and strapping 24 can be simply backed out of the anchor 28. In use, once the cargo has reached its destination, the strapping 24 is typically cut away from the buckle and the strapping 24 and retainer 10 can be backed out of the sidewall depression 26 to a condition approximating that shown in FIG. 12. At this stage, the retainers 10 are easily removed from the wall anchors 28, and the strapping is readily pulled out of the anchor, without a need to use a knife or fire or, for the higher lengths of strapping, a ladder.

It is possible, of course, after the strapping retainers have been removed from the wall anchors, that some will accidentally be left behind in the cargo transport unit. If the unit is drably colored, dark or poorly lit, then there is a possibility that a person could not notice such a retainer lying on a floor or other horizontal surface and inadvertently step on one and slip or otherwise result in compromised footing. Accordingly, the strapping retainer preferably is made of or includes a material that is highly visible in low light conditions in order to provide an enhanced visibility strapping retainer. Such is referred to herein as an "enhanced visibility characteristic," which can be achieved by making the retainer of brightly colored or fluorescent or phosphorescent material or have reflective surface features or have some other material or feature which enhances visibility and makes the retainer more readily visible within a cargo transport unit. In a preferred embodiment, the strapping retainer is made of a bright red material. Alternatively, rather than using such a material, it is instead possible to apply a surface treatment, such as a coating or tape, to all or part of the retainer such that it is readily visible within a darkened cargo transport unit.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A lading strapping retainer for use in combination with a strapping length and a cargo transport unit wall having an associated wall anchor, the lading strapping retainer comprising:
    an elongated body portion having a top end, a bottom end, and a strapping-engaging surface connecting said top end and said bottom end, wherein said body portion comprises a generally non-deformable material and is configured and sized such that it cannot fit between the cargo transport unit wall and the associated wall anchor when a portion of the strapping-engaging surface is engaged by a strapping length.

2. The lading strapping retainer of claim 1, wherein said generally non-deformable material has a flexural modulus of at least about 500 kpsi.

3. The lading strapping retainer of claim 1, wherein said generally non deformable material comprises a filled nylon polymer.

4. The lading strapping retainer of claim 1, wherein said generally non-deformable material comprises a glass-filled nylon polymer.

5. The lading strapping retainer of claim 1, wherein said generally nondeformable material comprises a filled nylon polymer having at least 30 weight percent glass filling, based on the total weight of the filled polymer.

6. The lading strapping retainer of claim 1, wherein said strapping-engaging surface is smoothly shaped.

7. The lading strapping retainer of claim 1, wherein said strapping-engaging surface has a generally circular profile.

8. The lading strapping retainer of claim 1, wherein said strapping-engaging surface has a generally teardrop-shaped profile.

9. The lading strapping retainer of claim 1, wherein the distance between said top end and said bottom end of the retainer is less than the width of the strapping length.

10. The lading strapping retainer of claim 1, wherein said strapping-engaging surface includes a plurality of raised knurls.

11. The lading strapping retainer of claim 1, wherein at least a portion of the lading strapping retainer has an enhanced visibility characteristic.

12. A lading strapping retainer for use in combination with a strapping length and a cargo transport unit wall having an associated wall anchor, the lading strapping retainer comprising:
an elongated body portion having a top end, a bottom end, and a strapping-engaging surface connecting said top end and said bottom end, wherein said body portion is configured and sized such that it cannot fit between the cargo transport unit wall and the associated wall anchor when a portion of the strapping-engaging surface is engaged by a strapping length; and
an ear extending from said top end, wherein said ear is capable of engaging the strapping length and supporting the body portion.

13. The lading strapping retainer of claim 12, wherein said ear includes a horizontal extension extending away from said body portion, and an overhang associated with and extending away from said horizontal extension, such that said ear defines a hook.

14. The lading strapping retainer of claim 13, said ear further comprising a vertical extension associated with said horizontal extension and extending away from the top end of the body portion.

15. The lading strapping retainer of claim 12, further comprising another ear extending from said bottom end and generally aligned with said ear extending from the top end.

16. The lading strapping retainer of claim 15, wherein said ears cooperate to form an open channel for engaging the strapping length.

17. The lading strapping retainer of claim 15, wherein said ears connect to form a closed channel for engaging the strapping length.

18. A cargo securing system, comprising:
a cargo transport unit having walls and a plurality of wall anchors associated with and spaced apart from said walls;
a strapping length positioned between one of said wall anchors and one of said walls and forming a receptor loop on a first side of said wall anchor; and
a strapping retainer positioned within and engaging said receptor loop of the strapping length, wherein said strapping retainer comprises an elongated body portion having a top end, a bottom end, and a strapping-engaging surface connecting said top end and said bottom end, wherein said body portion is configured and sized such that it cannot fit between the cargo transport unit wall and the associated wall anchor when a portion of the strapping-engaging surface is engaged by the strapping length.

19. The cargo-securing system of claim 18, wherein said cargo transporting unit is a railway boxcar.

20. A combination of cargo and a cargo-retaining system, comprising:
a cargo transport unit having a storage area which includes walls and a plurality of wall anchors associated with and spaced apart from said walls;
cargo positioned within said storage area of the transport unit;
a strapping length positioned between one of said wall anchors and one of said walls and forming a receptor loop on a first side of said wall anchor;
a strapping retainer positioned within and engaging said receptor loop of the strapping length, wherein said strapping retainer comprises an elongated body portion having a top end, a bottom end, and a strapping-engaging surface connecting said top end and said bottom end, wherein said body portion is configured and sized such that it cannot fit between the wall and the associated wall anchor when a portion of the strapping-engaging surface is engaged by the strapping length; and
said strapping length engages the cargo and secures the cargo in place by restraining its movement within the storage area.

21. A method of securing a strapping length to a wall of a cargo transport unit having an associated wall anchor with a front portion and a rear portion, the method comprising:
forming an initial loop in an end of the strapping length, wherein said initial loop comprises a receptor loop and a loose end;
passing the receptor loop through a space defined by the wall and the rear portion of the associated wall anchor from a first side of the wall anchor to a second side of the wall anchor, such that said loose end and a long end of the strapping length remain at the first side, wherein said long end is disposed between the wall and said loose end;
placing a retainer having a body with a strapping-engaging surface within said receptor loop, such that said receptor loop wraps around a portion of said strapping-engaging surface;
pulling the strapping length toward said first side until said receptor loop tightens about said strapping-engaging surface and said retainer seats adjacent to the wall anchor; and
wrapping said loose end and said long end around the front portion of the wall anchor toward said second side, such that said loose end is tightly secured between said long end and the wall anchor.

22. The method of claim 21, wherein pulling the strapping length toward the first side includes orienting the retainer such that a portion of the strapping-engaging surface extends away from the wall beyond the front portion of the wall anchor when the retainer seats adjacent to the wall anchor.

23. The method of claim 22, wherein wrapping said loose end and said long end around the front portion of the wall anchor includes securing the loose end at a second securing area spaced apart from said wall anchor.

24. The method of claim 23, wherein said second securing area is between said long end and said receptor loop.

25. The method of claim 21, further including a step of securing said long end to a buckle.

* * * * *

UNITED STATES PATENT AND TRADEMARK OFFICE
CERTIFICATE OF CORRECTION

PATENT NO. : 7,249,920 B2 Page 1 of 1
APPLICATION NO. : 11/156207
DATED : July 31, 2007
INVENTOR(S) : Early et al.

It is certified that error appears in the above-identified patent and that said Letters Patent is hereby corrected as shown below:

Col. 3, line 26, insert --a-- after "FIG. 15 is."
Col. 9, line 39, "cargo securing" should read --cargo-securing--.

Signed and Sealed this

Fourth Day of December, 2007

JON W. DUDAS
*Director of the United States Patent and Trademark Office*